(12) United States Patent
Liu et al.

(10) Patent No.: US 9,223,429 B2
(45) Date of Patent: Dec. 29, 2015

(54) TOUCH MODULE AND ELECTRONIC APPARATUS

(71) Applicant: HTC Corporation, Taoyuan County (TW)

(72) Inventors: Wei-Cheng Liu, Taoyuan County (TW); Fang-Chuen Wang, Taoyuan County (TW); Yung-Ming Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 235 days.

(21) Appl. No.: 14/141,430

(22) Filed: Dec. 27, 2013

(65) Prior Publication Data

US 2014/0285730 A1    Sep. 25, 2014

Related U.S. Application Data

(60) Provisional application No. 61/804,176, filed on Mar. 21, 2013.

(51) Int. Cl.

| | |
|---|---|
| *G02F 1/1335* | (2006.01) |
| *G06F 3/041* | (2006.01) |
| *G06F 3/0354* | (2013.01) |
| *G06F 1/16* | (2006.01) |
| *H04M 1/02* | (2006.01) |
| *H04M 1/22* | (2006.01) |
| *G06F 3/0488* | (2013.01) |

(52) U.S. Cl.
CPC ............. *G06F 3/0412* (2013.01); *G06F 1/169* (2013.01); *G06F 3/03547* (2013.01); *H04M 1/0266* (2013.01); *G06F 1/1626* (2013.01); *G06F 3/04886* (2013.01); *G06F 2203/0339* (2013.01); *H04M 1/0274* (2013.01); *H04M 1/0277* (2013.01); *H04M 1/22* (2013.01); *H04M 2250/22* (2013.01)

(58) Field of Classification Search
CPC ...................................................... G06F 3/0412
See application file for complete search history.

(56) References Cited

U.S. PATENT DOCUMENTS

2009/0266691 A1    10/2009    Ishioka et al.

FOREIGN PATENT DOCUMENTS

| TW | 200500695 | 1/2005 |
|---|---|---|
| TW | 200711101 | 3/2007 |
| TW | M377803 | 4/2010 |
| TW | 201219922 | 5/2012 |
| TW | 201239427 | 10/2012 |

OTHER PUBLICATIONS

"Office Action of Taiwan Counterpart Application", issued on Sep. 11, 2015, p. 1-p. 3, in which the listed references were cited.

*Primary Examiner* — Phu Vu
(74) *Attorney, Agent, or Firm* — Jianq Chyun IP Office

(57) ABSTRACT

A touch module, adapted for an electronic apparatus and including a cover, a touch sensor layer, a flexible printed circuit board (FPC), a light-emitting element and a light guide film is provided. The cover has at least one transparent icon. The touch sensor layer and the FPC are disposed under the cover, and the FPC is electrically connected to the touch sensor layer. The light-emitting element is mounted on the FPC, wherein the FPC is located between the cover and the light-emitting element. The light guide film is disposed under the cover, wherein the touch sensor layer is located between the cover and the light guide film. Light emitted by the light-emitting element is transmitted to the transparent icon through the light guide film. In addition, an electronic apparatus is also provided.

19 Claims, 6 Drawing Sheets

TOUCH MODULE AND ELECTRONIC APPARATUS

CROSS-REFERENCE TO RELATED APPLICATION

This application claims the priority benefits of U.S. provisional application Ser. No. 61/804,176, filed on Mar. 21, 2013. The entirety of the above-mentioned patent application is hereby incorporated by reference herein and made a part of this specification.

BACKGROUND OF THE DISCLOSURE

1. Field of the Application

The application generally relates to a touch module and an electronic apparatus, and more particularly, to a touch module and an electronic apparatus having a virtual bottom.

2. Description of Related Art

An electronic apparatus with touch sensing functions (e.g., a smart phone or a tablet computer) may compose a virtual bottom by disposing an icon next to a display region and a touch panel at the back. Accordingly, when a user touches the icon, a corresponding region on the touch panel can be driven to generate a touching signal. To make the icon easily identified, a light-emitting element can be disposed on an additional printed circuit board (PCB) or on a flexible printed circuit board (FPC), so that light emitted by the light-emitting element can be guided to the icon by utilizing a light guide film. However, as screen sized and speaker box volume increased continuously, there can be no additional space available in the electronic apparatus for disposing the light-emitting element on the printed circuit board or the flexible printed circuit board.

SUMMARY OF THE APPLICATION

The application is directed to a touch module having a smaller volume.

The application provides an electronic apparatus in which a touch module has a smaller volume.

The touch module of the application, adapted for an electronic apparatus, includes a cover, a touch sensor layer, a flexible printed circuit board, a light-emitting element and a light guide film. The cover has at least one transparent icon. The touch sensor layer is disposed under the cover. The flexible printed circuit board is disposed under the cover and electrically connected to the touch sensor layer. The light-emitting element is mounted on the flexible printed circuit board, wherein the flexible printed circuit board is located between the cover and the light-emitting element. The light guide film is disposed under the cover, wherein the touch sensor layer is located between the cover and the light guide film. Light emitted by the light-emitting element is transmitted to the transparent icon through the light guide film.

An electronic apparatus of the application includes above-said touch module and a housing. The housing has a housing opening, wherein the cover of the touch module is disposed on the housing and covering the housing opening of the housing, so as to construct an accommodating space with housing. The touch sensor layer, the flexible printed circuit board, the light-emitting element and the light guide film of the touch module are located in the accommodating space.

In summary, in the application, since the light-emitting element of the touch module is mounted on the flexible printed circuit board electrically connected to the touch sensor layer, the touch module can drive the light-emitting element without requiring additional printed circuit board or flexible printed circuit board. Accordingly, volume of the touch module may be reduced, and volume of the electronic apparatus may also be further reduced.

To make the above features and advantages of the present application more comprehensible, several embodiments accompanied with drawings are described in detail as follows.

DESCRIPTION OF THE EMBODIMENTS

Figure 1:
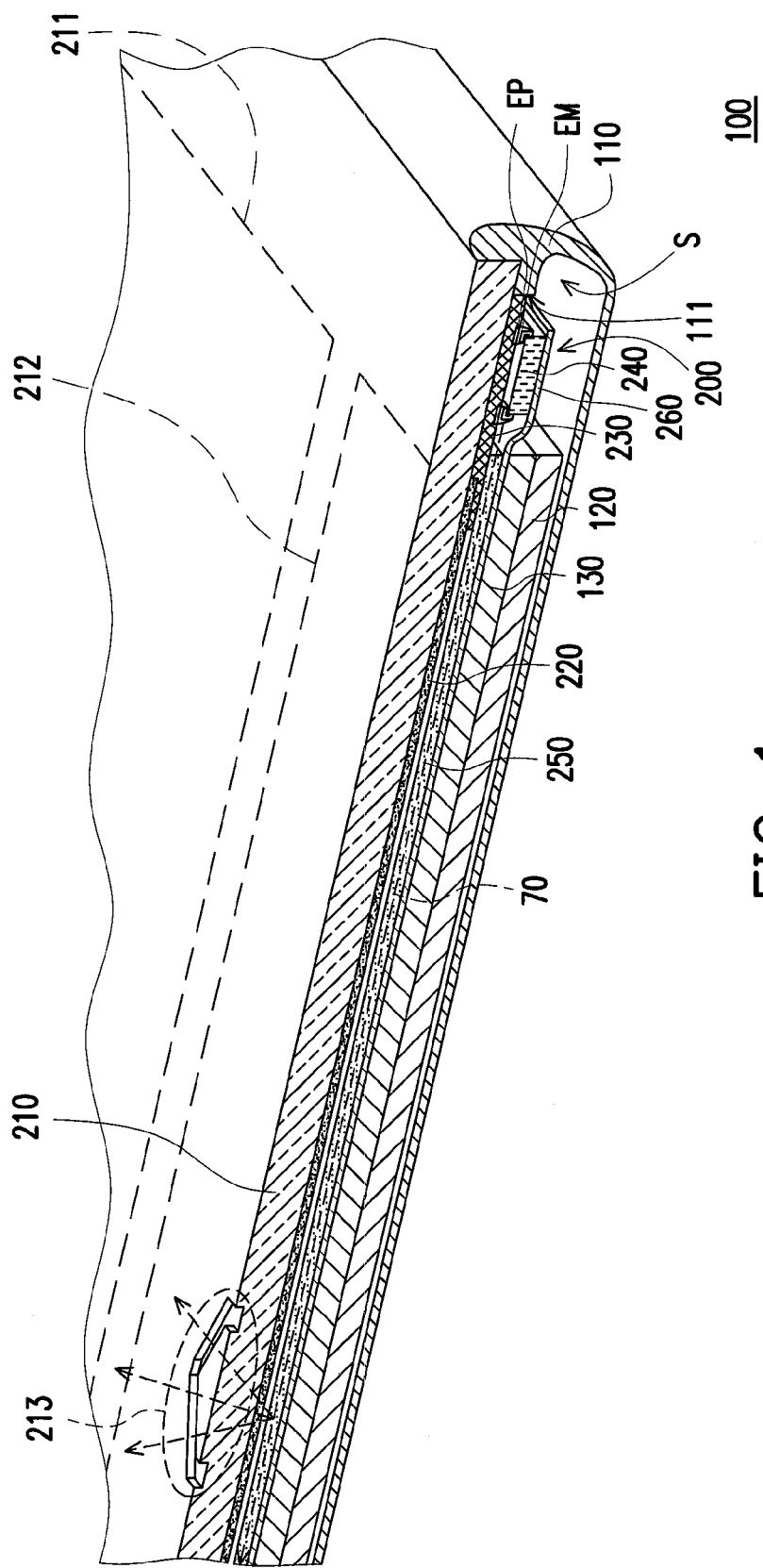
FIG. 1 is a schematic cross-sectional view of an electronic apparatus according to an embodiment of the application.

FIG. 1 is a schematic cross-sectional view of an electronic apparatus according to an embodiment of the application. Referring to FIG. 1, in the present embodiment, an electronic apparatus 100 includes a touch module 200 adapted for the electronic apparatus 100, and a housing 110. For instance, in the present embodiment, the electronic apparatus 100 can be an electronic apparatus having a touch sensing function, such as a cell phone or a tablet computer. More specifically, in the present embodiment, the touch module 200 includes a cover 210, a touch sensor layer 220, a flexible printed circuit board 230, a light-emitting element 240 and a light guide film 250. In the present embodiment, a material of the cover 210 is, for example, a glass or a plastic, and the light-emitting element 240 is, for example, a light-emitting diode (LED) or other appropriate light-emitting elements. On the other hand, the housing 110 has a housing opening 111, and the cover 210 of the touch module 200 is disposed on the housing 110 and covering the housing opening 111 of the housing 110, so as to substantially construct an accommodating space S together with the housing 110. Therein, the housing 110 is not limited to be composed of single or multiple parts. The touch sensor layer 220, the flexible printed circuit board 230, the light-emitting element 240 and the light guide film 250 of the touch module 200 are located in the accommodating space S. A structure design of the touch module 200 is described in detail below with reference to FIG. 2A to FIG. 2D.

Figure 2A:
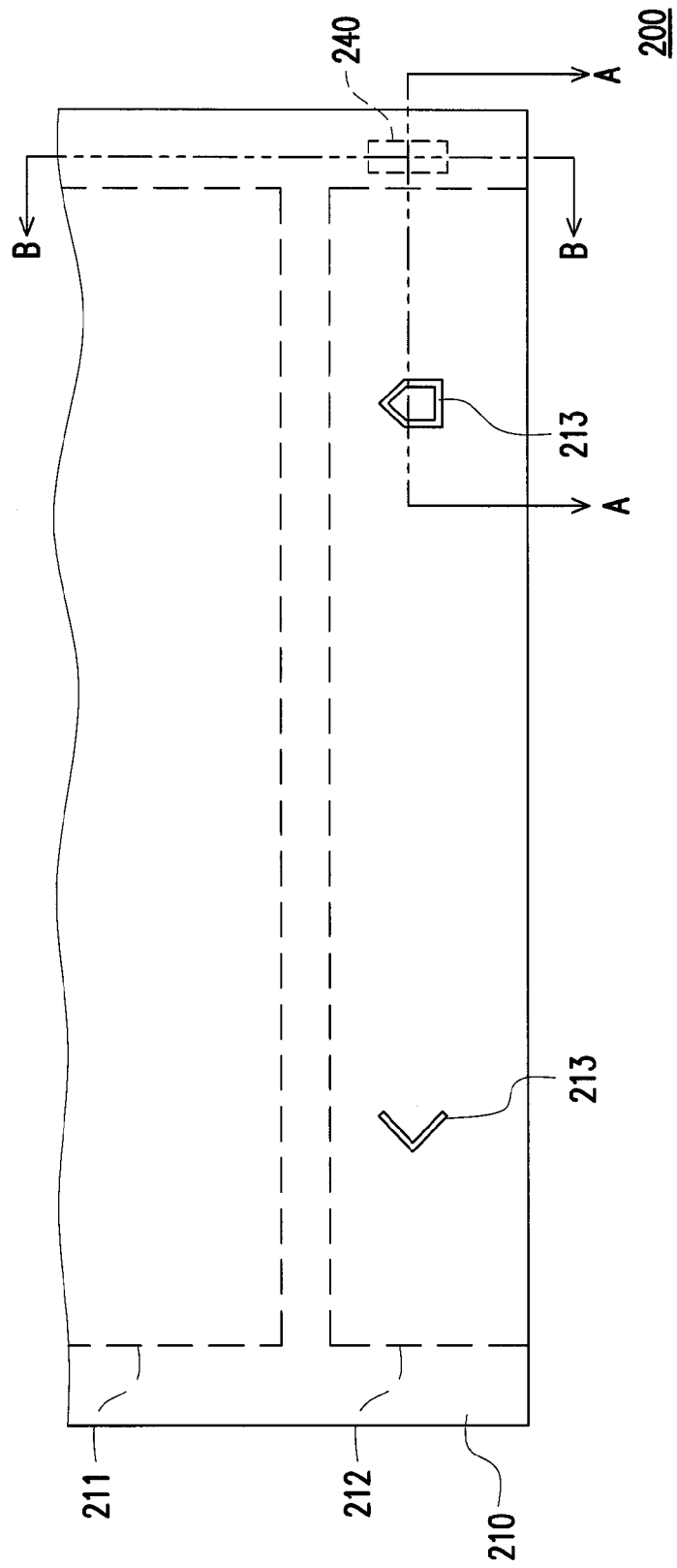
FIG. 2A is a schematic front view of a touch module of the embodiment depicted in FIG. 1.
Figure 2B:
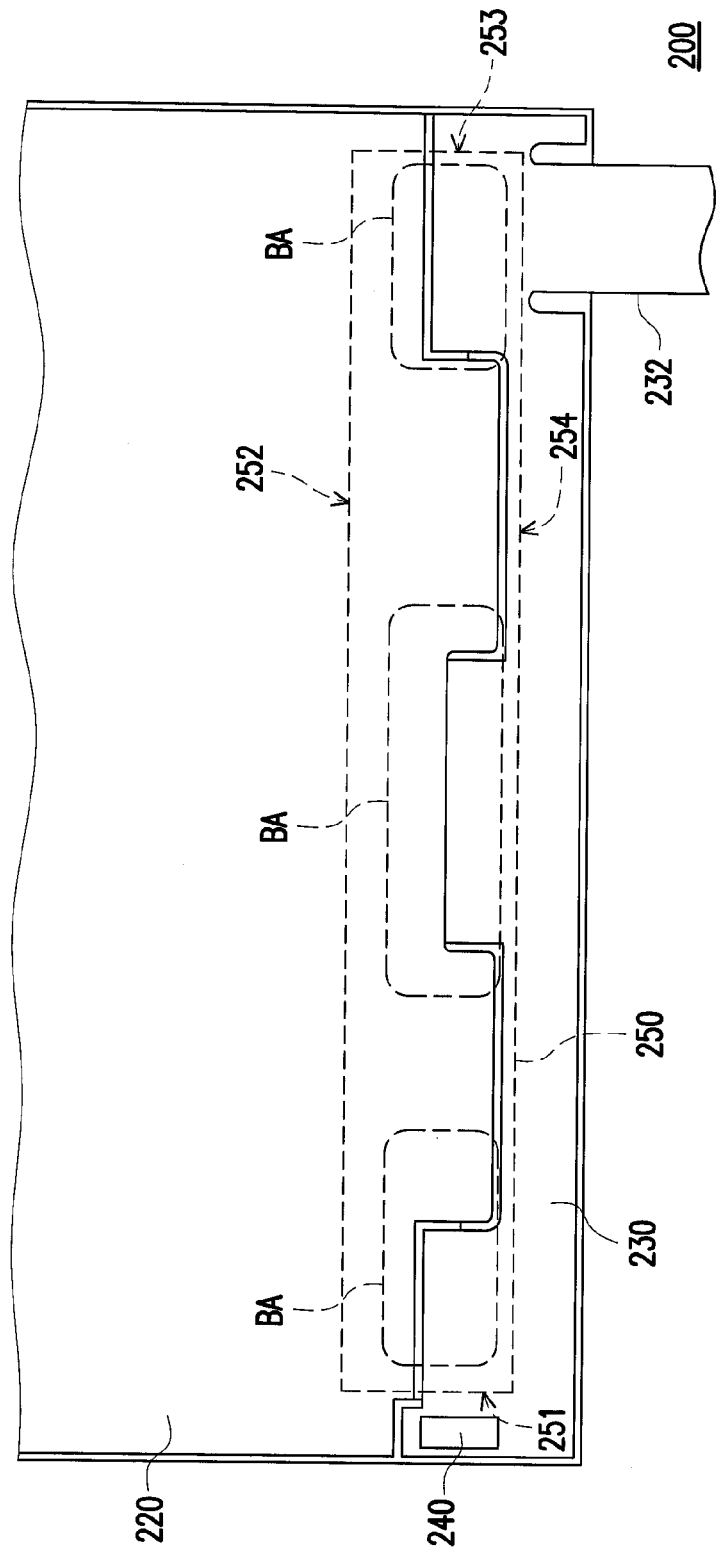
FIG. 2B is a schematic back view of the touch module depicted in FIG. 2A.
Figure 2C:
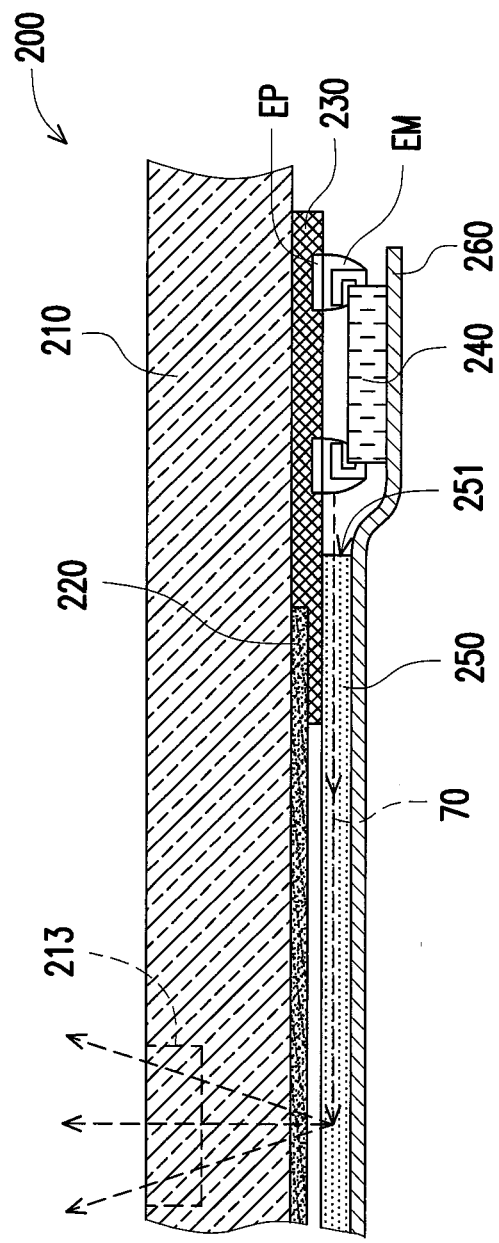
FIG. 2C is a schematic cross-sectional view of the touch module depicted in FIG. 2A along a line A-A.
Figure 2D:
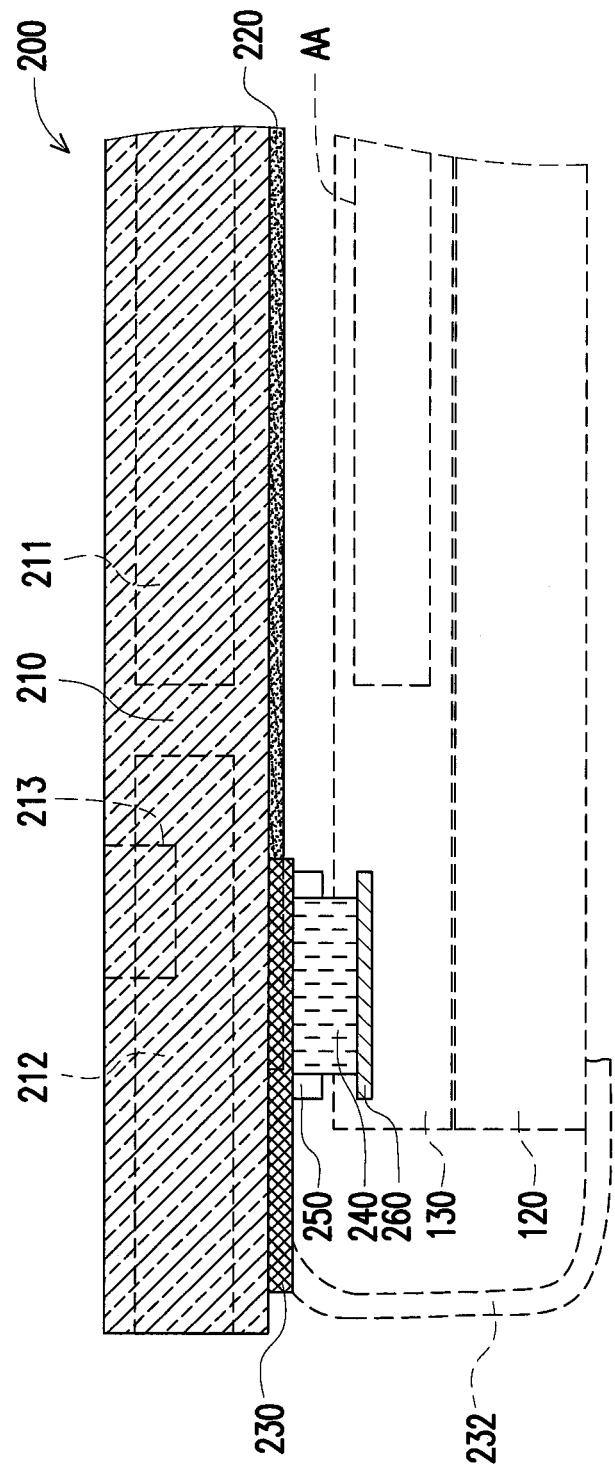
FIG. 2D is a schematic cross-sectional view of the touch module depicted in FIG. 2A along a line B-B.

FIG. 2A is a schematic front view of a touch module of the embodiment depicted in FIG. 1. FIG. 2B is a schematic back view of a touch module of the embodiment depicted in FIG. 2A. FIG. 2C is a schematic cross-sectional view of the touch module depicted in FIG. 2A along a line A-A. FIG. 2D is a schematic cross-sectional view of the touch module depicted in FIG. 2A along a line B-B. Referring to FIG. 1 and FIG. 2A to FIG. 2D together, in the present embodiment, the cover 210 of the touch module 200 includes a first region 211, a second region 212 and at least one transparent icon 213, and the transparent icon 213 is located on the second region 212. In addition, as shown in FIG. 2C, the touch sensor layer 220 is disposed under the cover 210, and the flexible printed circuit board 230 is also disposed under the cover 210 and the flexible printed circuit board 230 is electrically connected to the touch sensor layer 220. In addition, as shown in FIG. 2B, a plurality of bonding areas BA are provided on the second region 212 of the cover 210, and circuits of the touch sensor layer 220 and the flexible printed circuit board 230 are arranged in said bonding areas, so that the touch sensor layer 220 and the flexible printed circuit board 230 may be electrically connected to each other.

On the other hand, as shown in FIG. 2C, in the present embodiment, the light-emitting element 240 is mounted on the flexible printed circuit board 230, and the flexible printed circuit board 230 is located between the cover 210 and the light-emitting element 240. More specifically, in the present embodiment, the flexible printed circuit board 230 includes at least one exposed conductive end EP. A conductive adhesive material EM is provided on the conductive end EP, and the light-emitting element 240 is fixed on the flexible printed circuit board 230 through the conductive adhesive material EM. In the present embodiment, the conductive adhesive material is, for example, a solder. Because the light-emitting element 240 is merely used for providing light that is easily identified for the transparent icon 213, a required power thereof is relatively lower. Therefore, the light-emitting element 240 may be mounted on the flexible printed circuit board 230 without causing damages to the flexible printed circuit board 230 due to overheat.

In addition, the light guide film 250 is also disposed under the cover 210, and the touch sensor layer 220 is located between the cover 210 and the light guide film 250. In the present embodiment, the light-emitting element 240 is adjacent to an edge of the light guide film 250, and light 70 emitted by the light-emitting element 240 can enter the light guide film 250 from the edge of the light guide film 250. Furthermore, as shown in FIG. 2C, in the present embodiment, the touch module 200 further includes a shielding plate 260 covering the light guide film 250 and the light-emitting element 240. In the present embodiment, the shielding plate 260 is, for example, a Mylar thin film having a shielding effect. More specifically, in the present embodiment, the shielding plate 260 may cover the light guide film 250 and the light-emitting element 240 as well as covering gaps between the light guide film 250 and the light-emitting element 240 at the same time. Accordingly, a possibility for a part of light emitted by the light-emitting element 240 to leak through the gaps between the light guide film 250 and the light-emitting element 240 or other possible leaking regions may be lower, so as to enhance a light-use efficiency.

More specifically, as shown in FIG. 2B, in the present embodiment, the light guide film 250 is a rectangular sheet having two opposite short sides 251 and 253 and two opposite long sides 252 and 254, and the light-emitting element 240 is disposed at an edge adjacent to one of the short sides 251 and 253 of the light guide film 250. Accordingly, as shown in 2B and 2C, the light 70 emitted by the light-emitting element 240 can enter the light guide film 250 from one of the short sides 251 and 253, and be transmitted to the transparent icon 213 through the light guide film 250, so that the transparent icon 213 can be easily identified. For instance, in the present embodiment, the light 70 emitted by the light-emitting element 240 enters the light guide film 250 through the short side 251. On the other hand, referring back to FIG. 1 and FIG. 2D, in the present embodiment, the electronic apparatus 100 further includes a mainboard 120 and a display module 130. As shown in FIG. 1 and FIG. 2D, the mainboard 120 is disposed in the accommodating space S and electrically connected to the flexible printed circuit board 230. More specifically, as shown in FIG. 2B and FIG. 2D, in the present embodiment, the flexible printed circuit board includes a bent portion 232, and the bent portion 232 crosses the display module 130 to connect to the mainboard 120. The display module 130 is also disposed in the accommodating space S and electrically connected to the mainboard 120. More specifically, in the present embodiment, the light guide film 250 is located between the display module 130 and the touch sensor layer 220. In addition, as shown in FIG. 2D, the display module 130 has a display region AA, and the display region AA corresponds to the first region 211 of the cover 210. More specifically, in the present embodiment, the display module 130 can provide an image which is emitted from the display region AA and transmitted to the first region 211 of the cover 210, so as to provide an image frame to the outside.

Accordingly, the light-emitting element 240 of the touch module 200 may be mounted on the flexible printed circuit board 230 electrically connected to the touch sensor layer 220, and the flexible printed circuit board 230 may be bent to a desired position by passing other internal components (e.g., a chassis (not illustrated) or the display module 130) of the electronic apparatus 100 through the bent portion 232. Therefore, the touch module 200 can drive the light-emitting element 240 without requiring additional printed circuit board or flexible printed circuit board. As a result, the touch module 200 is advantageous in having small volume, so that the electronic apparatus 100 may also have its volume reduced, or more spaces for disposing other elements.

It should be noted that, in the present embodiment, although it is illustrated with the light 70 emitted by the light-emitting element 240 entering the light guide film 250 from one of the short sides 251 and 253 as an example, but the application is not limited thereto. In another illustrated embodiment, the light 70 emitted by the light-emitting element 240 can also be designed to enter the light guide film 250 through one of the long sides 252 and 254. Related description to the above are provide below with reference to FIG. 3.

Figure 3:
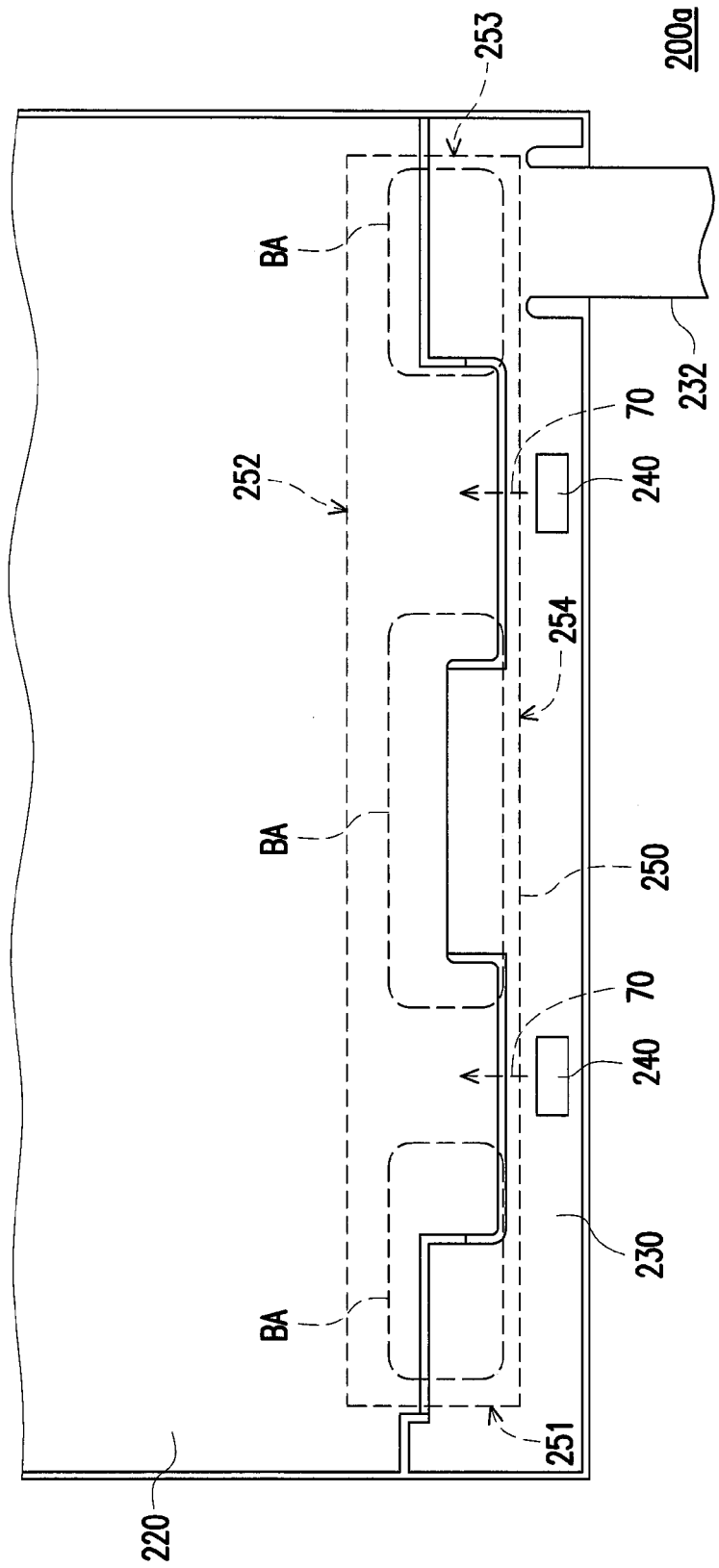
FIG. 3 is a schematic back view of a touch module according to another embodiment of the application.

FIG. 3 is a schematic back view of a touch module according to another embodiment of the application. Referring to FIG. 3, the touch module 300 of the present embodiment is similar to the touch module 200 depicted in FIG. 2B, and a difference between said touch modules is described as follows. As shown in FIG. 3, in the present embodiment, the light-emitting element 240 of the touch module 300 is disposed at an edge adjacent to one of the long sides 252 and 254 of the light guide film 250. Accordingly, the light 70 emitted by the light-emitting element 240 can enter the light guide film 250 from one of the long sides 252 and 254, so that the transparent icon 213 can be easily identified. For instance, in the present embodiment, the light 70 emitted by the light-emitting element 240 enters the light guide film 250 through the long side 254.

In the present embodiment, the touch module 300 has the light-emitting element 240 similar to that of the touch module 200, which is mounted on the flexible printed circuit board 230 electrically connected to the touch sensor layer 220. Therefore, the touch module 300 can also provide effects and advantages similar to that of the touch module 200, so related description thereof is omitted herein.

In summary, in the embodiments of the application, since the light-emitting element of the touch module is mounted on the flexible printed circuit board electrically connected to the touch sensor layer, the touch module can drive the light-emitting element without requiring additional printed circuit board or flexible printed circuit board. As a result, the touch module is advantageous in having small volume, so that the electronic apparatus may also have its volume reduced, or more spaces for disposing other elements.

Although the application has been described with reference to the above embodiments, it will be apparent to one of the ordinary skill in the art that modifications to the described embodiment may be made without departing from the spirit of the application. Accordingly, the scope of the application will be defined by the attached claims not by the above detailed descriptions.

What is claimed is:

1. A touch module, adapted for an electronic apparatus, comprising:
   a cover having at least a transparent icon;
   a touch sensor layer disposed under the cover;
   a flexible printed circuit board disposed under the cover and electrically connected to the touch sensor layer;
   a light-emitting element mounted on the flexible printed circuit board, wherein the flexible printed circuit board is located between the cover and the light-emitting element; and
   a light guide film disposed under the cover, wherein the touch sensor layer is located between the cover and the light guide film, and light emitted by the light-emitting element is transmitted to the transparent icon through the light guide film.

2. The touch module of claim 1, wherein the cover comprises a first region and a second region, and the transparent icon is located on the second region.

3. The touch module of claim 1, wherein the light-emitting element is adjacent to an edge of the light guide film, and the light emitted by the light-emitting element enters the light guide film from the edge of the light guide film.

4. The touch module of claim 1, wherein the light guide film is a rectangular sheet having two opposite short sides and two opposite long sides, and the light emitted by the light-emitting element enters the light guide film from one of the short sides or one of the long sides.

5. The touch module of claim 1, wherein a material of the cover comprises a glass.

6. The touch module of claim 1, wherein the electronic apparatus comprises a mainboard and a display module, and the flexible printed circuit board comprises a bent portion crossing the display module to connect to the mainboard.

7. The touch module of claim 1, wherein the flexible printed circuit board comprises at least one exposed conductive end.

8. The touch module of claim 7, wherein a conductive adhesive material is provided on the conductive end, the light-emitting element is fixed on the flexible printed circuit board through the conductive adhesive material, and the conductive adhesive material is a solder.

9. The touching module of claim 1, further comprising:
   a shielding plate covering the light guide film and the light-emitting element.

10. An electronic apparatus, comprising:
    a touch module, comprising:
        a cover having at least one transparent icon;
        a touch sensor layer disposed under the cover;
        a flexible printed circuit board disposed under the cover and electrically connected to the touch sensor layer;
        a light-emitting element mounted on the flexible printed circuit board, wherein the flexible printed circuit board is located between the cover and the light-emitting element; and
        a light guide film, disposed under the cover, wherein the touch sensor layer is located between the cover and the light guide film, and light emitted by the light-emitting element is transmitted to the transparent icon through the light guide film; and
    a housing having a housing opening, wherein the cover of the touch module is disposed on the housing and covering the housing opening of the housing so as to construct an accommodating space with housing, and the touch sensor layer, the flexible printed circuit board, the light-emitting element and the light guide film of the touch module are located in the accommodating space.

11. The electronic apparatus of claim 10, wherein the cover comprises a first region and a second region, and the transparent icon is located on the second region.

12. The electronic apparatus of claim 11, further comprising:
    a mainboard disposed in the accommodating space and electrically connected to the flexible printed circuit board; and
    a display module disposed in the accommodating space and electrically connected to the mainboard, wherein the light guide film is located between the display module and the touch sensor layer, and the display module has a display region corresponding to the first region of the cover.

13. The electronic apparatus of claim 10, wherein the light-emitting element is adjacent to an edge of the light guide film, and the light emitted by the light-emitting element enters the light guide film from the edge of the light guide film.

14. The electronic apparatus of claim 10, wherein the light guide film is a rectangular sheet having two opposite short sides and two opposite long sides, and the light beam provided by the light-emitting element enters the light guide film from one of the short sides or one of the long sides.

15. The electronic apparatus of claim 10, wherein a material of the cover comprises a glass.

16. The electronic apparatus of claim 12, wherein the flexible printed circuit board comprises a bent portion crossing the display module to connect to the mainboard.

17. The electronic apparatus of claim 10, wherein the flexible printed circuit board comprises at least one exposed conductive end.

18. The electronic apparatus of claim 17, wherein a conductive adhesive material is provided on the conductive end, the light-emitting element is fixed on the flexible printed circuit board through the conductive adhesive material, and the conductive adhesive material is a solder.

19. The electronic apparatus of claim 10, wherein the touch module further comprises:
    a shielding plate covering the light guide film and the light-emitting element.

* * * * *